United States Patent
LeMieux

(10) Patent No.: US 7,100,438 B2
(45) Date of Patent: Sep. 5, 2006

(54) METHOD AND APPARATUS FOR DETERMINING A SITE FOR AN OFFSHORE WIND TURBINE

(75) Inventor: David Lawrence LeMieux, Tehachapi, CA (US)

(73) Assignee: General Electric Company, Schenectady, NY (US)

( * ) Notice: Subject to any disclaimer, the term of this patent is extended or adjusted under 35 U.S.C. 154(b) by 227 days.

(21) Appl. No.: 10/885,330

(22) Filed: Jul. 6, 2004

(65) Prior Publication Data

US 2006/0005617 A1    Jan. 12, 2006

(51) Int. Cl.
*G01M 17/02* (2006.01)
(52) U.S. Cl. ...................... 73/170.16; 290/55
(58) Field of Classification Search ............. 73/170.16; 290/55; 416/41
See application file for complete search history.

(56) References Cited

U.S. PATENT DOCUMENTS

| | | | |
|---|---|---|---|
| 3,968,954 A | | 7/1976 | Casco et al. |
| 4,101,244 A | * | 7/1978 | Grotberg ...................... 416/41 |
| 4,576,520 A | | 3/1986 | Suh et al. |
| 4,639,227 A | | 1/1987 | Rademakers |
| 5,108,326 A | | 4/1992 | Seiler |
| 5,528,493 A | | 6/1996 | Potter |
| 6,210,075 B1 | | 4/2001 | Korloo |
| 6,529,445 B1 | | 3/2003 | Laws |
| 6,564,741 B1 | | 5/2003 | Nelson |
| 2003/0168864 A1 | * | 9/2003 | Heronemus et al. .......... 290/55 |
| 2004/0056486 A1 | | 3/2004 | Wobben |
| 2004/0169376 A1 | * | 9/2004 | Ruer et al. ..................... 290/55 |
| 2005/0019100 A1 | * | 1/2005 | Simpson ..................... 405/166 |
| 2006/0056972 A1 | * | 3/2006 | DeLong .................. 416/132 B |

OTHER PUBLICATIONS

Reliable and High Precision Wave-Directional and Meteorological Measurements with MEDOUSA, Martedec's design and construction of a Wave-Directional Data Buoy, MARTEDEC S.A.—Achillieos 96 17563 P. Faliron Tel: +30 1 9850506, +30 1 9850232, Fax: +30 1 9851516 e-mail: eant@ath.forthnet.gr.
Medousa, The wave-directional data buoy "Medousa" was developed and built by the Marine Technology Development Company. It carries out reliable and high precision wave-directional and meteorological measurements, http://www.martedec.gr/medousa2.htm.

* cited by examiner

*Primary Examiner*—Edward Lefkowitz
*Assistant Examiner*—Andre Allen
(74) *Attorney, Agent, or Firm*—James E. McGinness, Esq.; Armstrong Teasdale LLP

(57) ABSTRACT

A method for determining a site for an offshore wind turbine includes determining a plurality of possible site locations, and positioning an offshore assembly at at least one of the possible site locations, wherein the assembly includes a floating support structure, a tower extending upwardly from the floating support structure, equipment coupled to the tower, and a counter-balance system coupled to the floating support structure at a location below a center of gravity of the floating support structure. The method further includes measuring conditions at the at least one of the possible site locations using the equipment, and determining a site for the offshore wind turbine from the at least one of the possible site locations based on the conditions of the plurality of possible site locations.

19 Claims, 4 Drawing Sheets

METHOD AND APPARATUS FOR DETERMINING A SITE FOR AN OFFSHORE WIND TURBINE

BACKGROUND OF THE INVENTION

This invention relates generally to offshore wind turbines, and more particularly to methods and apparatus for determining a site for an offshore wind turbine.

Wind power is quickly becoming a growing energy source around the world. Conventionally, wind turbines are clustered together as wind farms in locations that have favorable wind conditions. However, placement of these wind farms is limited due to the desire to place the wind turbines in remote locations and the need to place the wind turbines in a location with favorable wind conditions to provide increased power output.

Wind turbines are currently being sited at offshore locations. Offshore wind turbines are desirable because they provide additional locations to place wind turbines and they provide favorable wind conditions due to the lack of obstruction for wind currents. However, identifying favorable wind resource locations is a challenge to long term economic competitiveness and also a key for business development strategies. Known identification techniques include erecting a meteorological tower upon a foundation secured to the sea floor to measure wind conditions. However, these meteorological towers are expensive to construct and are stationary with respect to the sea floor. Other known identification techniques include dispersing data buoys to collect wind condition measurements. However, these data buoys typically collect wind condition data at or near the water surface, which can be significantly different than the wind conditions at higher elevations, such as the elevation of conventional wind turbines. Furthermore, these data buoys are susceptible to wave motion which can distort wind condition readings. Accordingly, identification techniques of the kind presently in use have not previously provided wind condition measurements in a cost effective and reliable manner.

BRIEF DESCRIPTION OF THE INVENTION

In one aspect, a method is provided for determining a site for an offshore wind turbine. The method comprises determining a plurality of possible site locations, and positioning an offshore assembly at at least one of the possible site locations, wherein the assembly includes a floating support structure, a tower extending upwardly from the floating support structure, equipment coupled to the tower, and a counter-balance system coupled to the floating support structure at a location below a center of gravity of the floating support structure. The method further includes measuring conditions at least one of the possible site locations using the equipment, and determining a site for the offshore wind turbine from the at least one of the possible site locations based on the conditions of the plurality of possible site locations.

In another aspect, an assembly is provided that includes a floating support structure, a tower extending upwardly from the floating support structure, equipment coupled to the tower, and a counter-balance system coupled to the floating support structure at a location below a center of gravity of the floating support structure.

In yet another aspect, an assembly is provided for determining a location for an offshore wind turbine. The assembly comprises a floating support structure, a tower extending upwardly from the floating support structure, and equipment coupled to the tower at a height above the water surface level. The height is selected to measure wind conditions at the elevation of the offshore wind turbine above the water surface level. The assembly further comprises a counter-balance system coupled to the floating support structure at a location below a center of gravity of the floating support structure.

DETAILED DESCRIPTION OF THE INVENTION

Figure 1:
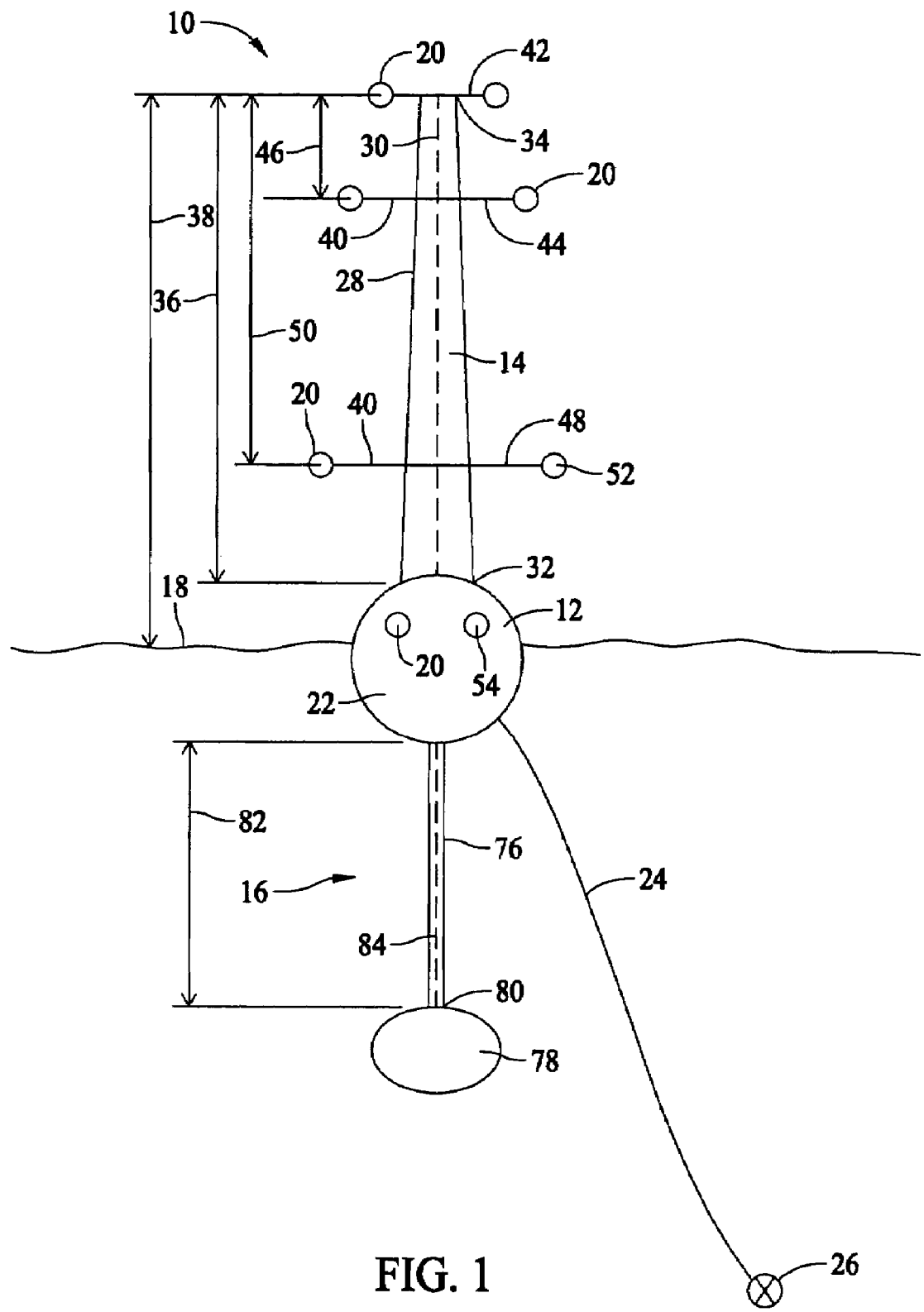
FIG. 1 is a side elevational view of a tower assembly.
Figure 2:
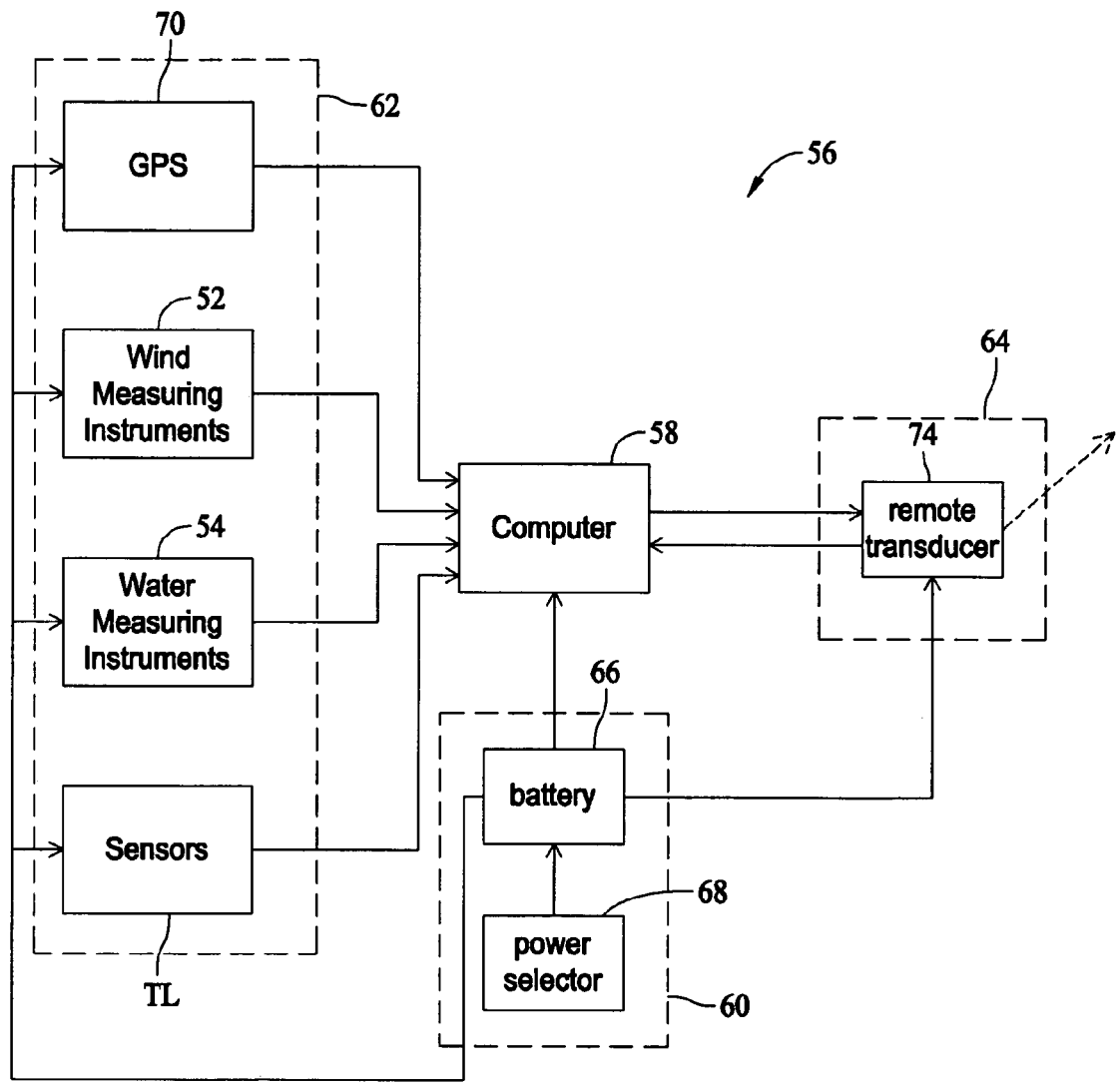
FIG. 2 is a block schematic diagram of the tower assembly shown in FIG. 1.

FIG. 1 is a side elevational view of a tower assembly 10. FIG. 2 is a block schematic diagram of tower assembly 10. Tower assembly 10 is used to determine a favorable site for an offshore wind turbine by measuring certain conditions, such as, for example, wind conditions and water conditions. Tower assembly 10 includes a floating support structure 12, a tower 14 extending upwardly from support structure 12, and a counter-balance system 16 coupled to support structure 12 for stabilizing tower 14 above a water surface 18. Equipment 20 is coupled to tower 14 for measuring the wind and water conditions.

Floating support structure 12 includes a buoy 22 for suspending tower 14 above water surface 18. In an alternative embodiment, a plurality of buoys 22 are provided for additional support and stability for tower assembly 10. The plurality of buoys 22 are coupled together to facilitate providing support to tower assembly 10, and in one embodiment have a triangular shape. Alternatively, buoys 22 have a square shape. Optionally, due to the stability provided by support structure 12, tower assembly 10 does not include counter-balance system 16. In one embodiment, support structure 12 is only partially submerged such that a portion of support structure 12 is located above water surface 18. As such, tower 14 is elevated above water surface 18 to facilitate reducing wear on tower 14 and increasing the useful life of tower 14. In another embodiment, support structure 12 is fully submerged below water surface 18 to facilitate reducing movement of tower 14 due to wave motions. Accordingly, more accurate wind condition data can be obtained by equipment 20.

Due to the floating characteristics of support structure 12, tower assembly 10 is capable of being moved from location to location. However, in an alternative embodiment, a mooring line 24 is coupled to support structure 12 and then operatively coupled to an anchor 26 to facilitate retaining tower assembly 10 at that location. As such, tower assembly 10 is capable of maintaining position for a sufficient amount of time so that data can be gathered about each such location.

Tower 14 includes an elongated body 28 having a longitudinal axis 30 extending between a base 32 and a tip 34. Tower 14 is coupled to floating support structure 12 at base 32. In the exemplary embodiment, tower 14 has a substantially circular cross-section and is wider at base 32 than at tip 34 to facilitate supporting tower 14. Alternatively, tower 14 has a uniform cross-section between base 32 and tip 34. In another embodiment, tower 14 is formed from a plurality of members having a column, cross beam, and truss construction. Tower 14 has a tower height 36 such that tip 34 is located a distance 38 from water surface 18 to facilitate measuring wind conditions at an elevation that is substantially similar to the elevation at which the offshore wind turbine (not shown) may be located. In one embodiment, tower height 36 ranges from approximately ten to two hundred meters. In another embodiment, tower height 36 ranges from approximately sixty to eighty meters. Tower height 36 is selected based on the anticipated wind turbine height and the tower assembly characteristics, such as, for example, material strength, material cost, tower assembly weight, buoyancy, and the like. In an alternative embodiment, tower 14 is secured to support structure 12 by a plurality of guy wires (not shown).

Tower 14 includes a plurality of beams 40 that extend generally perpendicularly with respect to tower longitudinal axis 30. In the exemplary embodiment, equipment 20 is coupled to beams 40. Beams 40 are positioned on tower 14 at varying elevations such that equipment 20 can collect data relating to wind conditions at various elevations. In the exemplary embodiment, tower 14 includes a first beam 42 coupled to tip 34 so that wind condition data can be obtained at an elevation that is substantially equal to the elevation at which the wind turbine may be positioned. A second beam 44 is coupled to tower 14 at a distance 46 from tip 34 to obtain wind condition data at another elevation similar to an elevation at which turbine blades coupled to the wind turbine (not shown) may be operated. A third beam 48 is coupled to tower 14 at a distance 50 from tip 34 to obtain wind condition data at yet another elevation.

Equipment 20 includes a plurality of wind measuring instruments 52, a plurality of water measuring instruments 54, and a data system 56. Wind measuring instruments 52 facilitate measuring wind conditions, such as, but not limited to, wind speed, wind direction, air pressure, temperature, humidity, and the like. In one embodiment, wind measuring instruments 52 include instruments such as, but not limited to, rate gyros, anemometers, accelerometers, inclinometers, and the like. Water measuring instruments 54 facilitate measuring water conditions, such as, but not limited to, wave height, wave frequency, wave direction, water flow direction, water temperature, water depth, and the like. In the exemplary embodiment, wind measuring instruments 52 are coupled to beams 40. Alternatively, wind measuring instruments 52 are coupled directly to tower 14 or to support structure 12. Water measuring instruments 54 are coupled to support structure 12. Alternatively, water measuring instruments 54 are coupled to tower 14 or counter-balance system 16.

As illustrated in FIG. 2, data system 56 includes a computer 58 for acquiring and processing data relating to the wind conditions and the water conditions. In the exemplary embodiment, data system 56 includes a power subsystem 60, a data acquisition subsystem 62, and a data transmission subsystem 64. The power subsystem 60 includes a rechargeable battery 66 for powering the equipment 20, and a power generator 68 for recharging battery 66. In the exemplary embodiment, power generator 68 includes at least one solar panel. In another embodiment, power generator 68 includes at least one wind charger. Battery 66 facilitates supplying power to computer 58, data acquisition subsystem 62, and data transmission subsystem 64.

Data acquisition subsystem 62 includes a global positioning system (GPS) transmitter 70 for determining the location of tower assembly 10, wind measuring instruments 52, water measuring instruments 54, and sensors 72. Data transmission subsystem 64 includes a remote transceiver 74 for transmitting and receiving data to and from tower assembly 10. In the exemplary embodiment, transceiver 74 communicates with a work station (not shown) via radio frequency transmissions. Alternatively, transceiver 74 communicates with the work station via a satellite uplink or a cable.

In operation, data generated by each of the components of data acquisition subsystem 62 is transmitted to computer 58 where the data is processed and stored. The data is then transmitted to data transmission subsystem 64 where transceiver 74 transmits the data to the work station. In an alternative embodiment, transceiver 74 receives signals transmitted from the work station requesting that certain data be transmitted to the work station. Transceiver 74 then communicates the request to computer 58 and back to the work station.

Returning to FIG. 1, counter-balance system 16 includes a column 76 coupled to floating support structure 12 and a counterweight 78 coupled to column 76. In the exemplary embodiment, counterweight 78 is coupled to an end 80 of column 76. Alternatively, counterweight 78 is coupled to column 76 remote from end 80. Column 76 has a length 82 that is variably selected to position counterweight 78 remote from support structure 12 to facilitate increasing the stabilizing effect of counter-balance system 16. Counterweight 78 has a mass and size that are variably selected based on stabilizing effect and cost considerations. In one embodiment, counterweight 78 is fabricated from a material, such as, but not limited to, a lead material. Optionally, a plurality of guy wires (not shown) are coupled between counter-balance system 16 and support structure 12.

Column 76 has a longitudinal axis 84 extending between support structure 12 and counterweight 78. In the exemplary embodiment, longitudinal axis 84 is substantially aligned with a center of gravity of tower assembly 10 such that counter-balance assembly facilitates stabilizing tower assembly 10. Specifically, counterweight 78 stabilizes tower assembly 10 due to the gravitation force of counterweight 78 returning counter-balance system 16 to a resting, or neutral, position. Accordingly, counter-balance system 16 facilitates countering movement of tower 14 due to wind and/or wave forces and facilitates returning tower to a substantially vertical orientation. As such, equipment 20 is capable of acquiring more reliable data.

Figure 3:
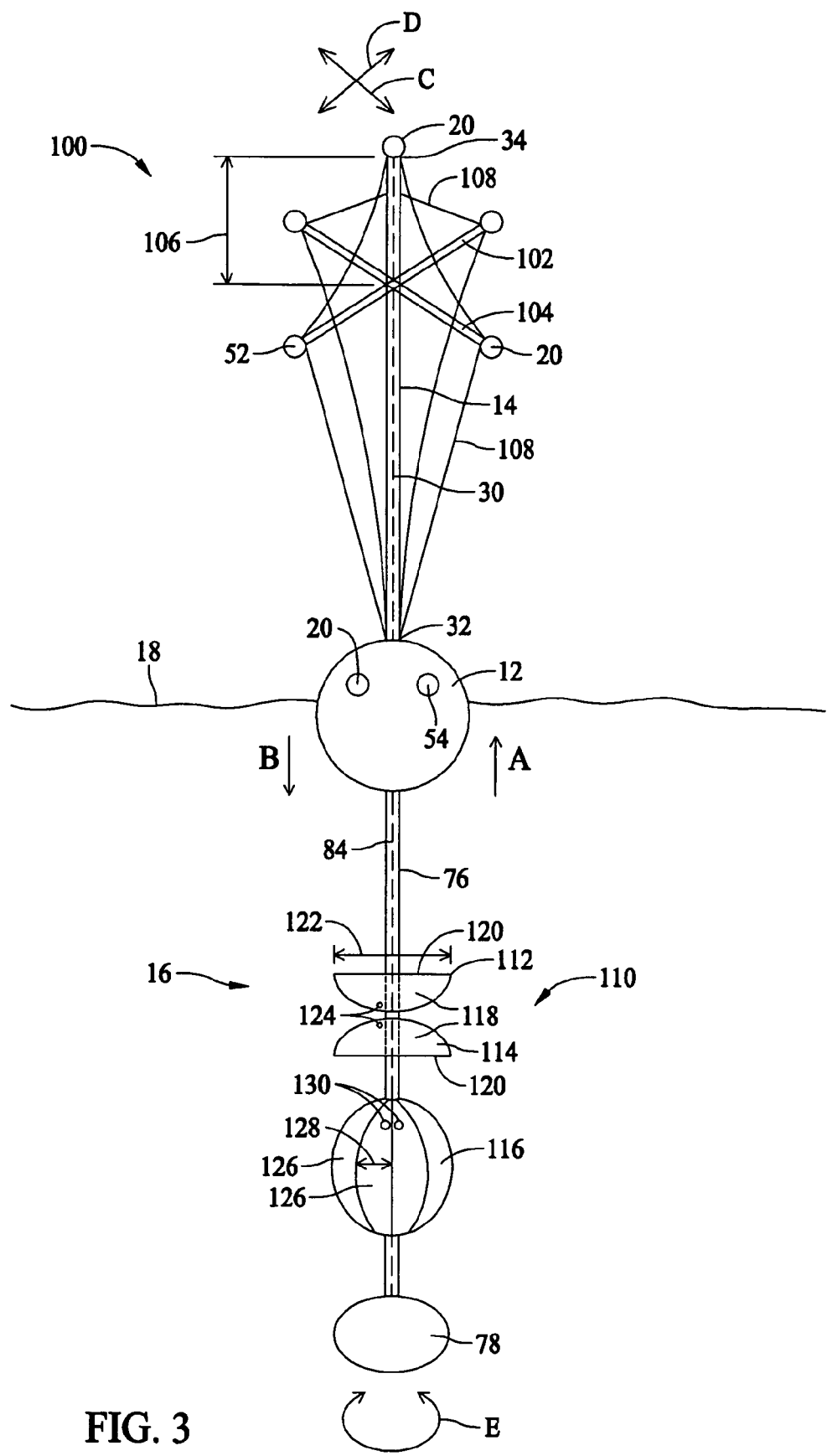
FIG. 3 is a perspective view of another tower assembly.

FIG. 3 is a perspective view of an alternative tower assembly 100. Tower assembly 100 is substantially similar to tower assembly 10 (described above in relation to FIGS. 1 and 2) except as noted below. Like reference characters of tower assembly 10 are therefore used with like features of tower assembly 100 where applicable in FIG. 3. Tower assembly 100 includes floating support structure 12, tower 14, and counter-balance system 16.

A first beam 102 and a second beam 104 are coupled to tower 14 at a distance 106 from tip 34. Beams 102 and 104 extend perpendicularly with respect to tower longitudinal axis 30. In one embodiment, beams 102 and 104 are orthogonally positioned with respect to one another and with respect to tower 14. Equipment 20 is coupled to beams 102 and 104 so that wind condition data can be obtained. In one embodiment, equipment 20 is coupled to tower tip 34. Moreover, a plurality of guy wires 108 extend between tower tip 34 and beams 102 and 104, and a plurality of guy wires 108 extend between tower base 32 and beams 102 and 104. Guy wires 108 facilitate supporting and stabilizing tower 14 with respect to support structure 12. Alternatively, guy wires 108 are coupled to counter-balance system 16.

Counter-balance system 16 includes column 76, counterweight 78, and a dampener subsystem 110. Dampener subsystem 110 facilitates providing hydrodynamic drag to reduce movement of tower assembly 100 and to increase stability of tower assembly 100. Dampener subsystem 110 is used to limit movement in a vertical direction, in a horizontal direction, and/or in a rotational direction.

In one embodiment, dampener subsystem 110 includes a first dampening member 112, a second dampening member 114, and a third dampening member 116. Dampening members 112, 114 and 116 are coupled to column 76 between support structure 12 and counterweight 78. First and second dampening members 112 and 114 are bowl shaped having a concave body 118 with an open end 120 having a diameter 122 that is variably selected to provide a large enough surface area of body 118 to provide a stabilizing effect on tower assembly 100. Alternatively, dampening members 112 and 114 have a different shape, such as, for example, a box shape, a disk shape, or a cylindrical shape.

First and second dampening members 112 and 114 are coupled to column 76 such that open ends 120 extend perpendicularly with respect to column longitudinal axis 84, and such that open ends 120 are positioned generally opposed with respect to one another. Accordingly, first and second dampening members 112 and 114 facilitate reducing movement of tower assembly 100 in the vertical direction. Specifically, first dampening member 112 creates hydrodynamic drag on tower assembly 100 when tower assembly 100 is moving in the direction of arrow A, and second dampening member 114 creates hydrodynamic drag on tower assembly 100 when tower assembly 100 is moving in the direction of arrow B. Optionally, first and second dampening members 112 and 114 include a plurality of holes 124 extending through body 118 that allow water to be channeled as a jet thereby facilitating a dampening effect on tower assembly 100 movement.

Third dampening member 116 includes a plurality of fins 126 having a semi-spherical shape. Alternatively, fins have other shapes, such as, but not limited to, a triangular shape, a rectangular shape, and the like. Fins 126 are coupled to column 76 along column longitudinal axis 84, and extend perpendicularly outward from column 76 for a distance 128. In one embodiment, third dampening member 116 includes four fins 126 equally spaced apart from one another. In an alternative embodiment, third dampening member 116 includes more or less than four fins 126, and fins 126 have a non-uniform spacing. Fins 126 facilitate attenuating tower assembly 100 motion in the side to side direction, such as in the direction of arrow C or arrow D. Moreover, fins 126 facilitate reducing rotational motion of tower assembly 100 in the direction of arrow E. Optionally, third dampening member 116 includes a plurality of holes 130 extending through fins 126 that allow water to be channeled as a jet thereby facilitating a dampening effect on tower assembly 100 movement.

Figure 4:
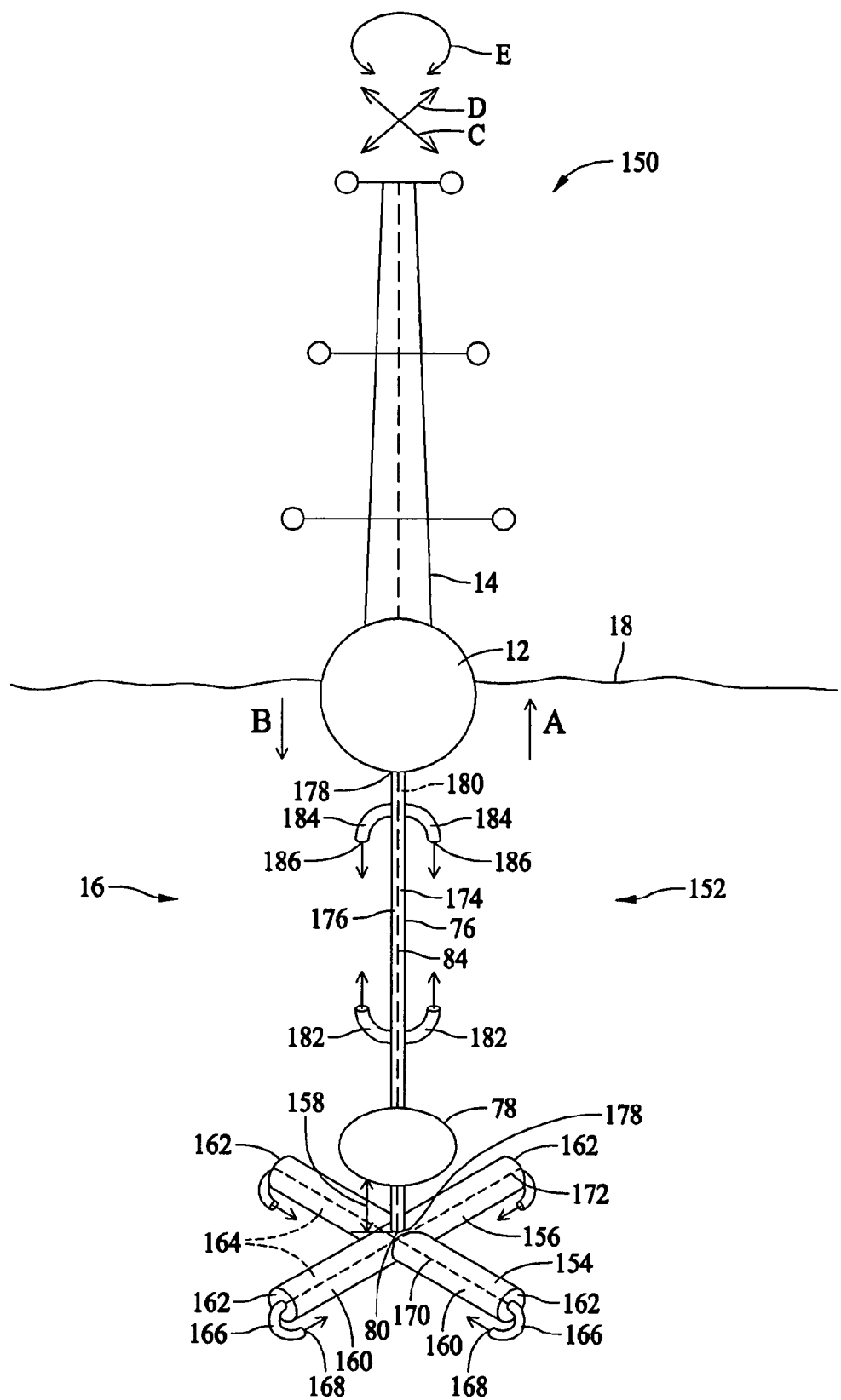
FIG. 4 is a perspective view of another tower assembly.

FIG. 4 is a perspective view of another tower assembly 150. Tower assembly 150 is substantially similar to tower assemblies 10 and 100 (described above in relation to FIGS. 1–3) except as noted below. Like reference numbers of tower assemblies 10 and 100 are therefore used with like features of tower assembly 150 where applicable in FIG. 4. Tower assembly 150 includes floating support structure 12, tower 14, and counter-balance system 16.

Counter-balance system 16 includes column 76, counterweight 78, and a dampener subsystem 152. Dampener subsystem 152 includes a first dampening tube 154 and a second dampening tube 156. First and second dampening tubes 154 and 156 are coupled to column end 80 at a distance 158 generally vertically below counterweight 78. Alternatively, dampening tubes 154 and 156 are coupled to column 76 between support structure 12 and counterweight 78. In one embodiment, dampening tubes 154 and/or 156 are coupled to a hoist system (not shown) such that dampening tubes 154 and/or 156 can be raised and/or lowered with respect to support structure 12. As such, tower assembly 150 is capable of being transported and/or towed from one location to another location. In the exemplary embodiment, dampening tubes 154 and 156 extend perpendicularly with respect to column longitudinal axis 84 and are orthogonally positioned with respect to one another and with respect to column 76 such that dampening tubes 154 and 156 have an X configuration. Alternatively, more or less than two dampening tubes 154 and 156 are employed within dampener subsystem 152, and dampening tubes 154 and 156 have alternative configurations. In another alternative embodiment, at least one of dampening tubes 154 and 156 are spherical in shape.

In one embodiment, dampening tubes 154 and 156 are cylindrical members having a body 160 that extends between opposing ends 162 and a hollow cavity 164 extending therebetween. Alternatively, dampening tubes 154 and 156 have a cross sectional profile other than a circular cross-sectional profile. Dampening tubes 154 and 156 are filled with water to add water mass and include a jet member 166 at each end 162. In one embodiment, jet members 166 channel water from hollow cavity 164 of each dampening tube 154 and 156. Jet members 166 have a curvilinear shape wherein a distal end 168 of each jet member 166 is oriented such that water flowing through jet member 166 is channeled along a longitudinal axis 170 or 172 of the respective dampening tubes 154 or 156 in the direction of column 76. Accordingly, the exit direction of the water flow for each jet member 166 is generally opposite the direction of the mass movement of tower assembly 150, thereby providing a dampening effect on tower assembly 150 movement in the horizontal direction or on rotational movement of tower assembly 150.

In one embodiment, column 76 includes a third dampening tube 174 extending between support structure 12 and first and second dampening tubes 154 and 156. Third dampening tube 174 is a cylindrical member having a body 176 that extends between opposing ends 178 and a hollow cavity 180 extending therebetween. Alternatively, dampening tube 174 has a cross sectional profile other than a circular cross-sectional profile. Dampening tube 174 is filled with water to add water mass and includes a plurality of upward facing jet members 182 and a plurality of downward facing jet members 184. In one embodiment, dampening tube 174 is coupled to a hoist system (not shown) such that dampening tube 174 can be raised and/or lowered with respect to support structure 12. As such, tower assembly 150 is capable of being transported and/or towed from one location to another location.

In one embodiment, jet members 182 and 184 channel water from hollow cavity 180. Jet members 182 and 184 have a curvilinear shape wherein a distal end 186 of each jet member 166 is oriented such that water flowing through the respective jet member 182 or 184 is channeled generally parallel to column longitudinal axis 84. Specifically, upward facing jet members 182 channel water generally vertically upward and downward facing jet members 184 channel water generally vertically downward. Accordingly, the exit direction of the water flow for each jet member 182 or 184 is generally opposite the direction of the mass movement of tower assembly 150, thereby providing a dampening effect on tower assembly 150 movement in the vertical direction.

The above-described tower assembly is fabricated in a cost-effective and reliable manner. The tower assembly includes a floating support structure capable of moving between multiple testing sites, a tower extending upwardly from the support structure to an elevation appropriate for measuring wind conditions for a wind turbine, and a counter-balance system that facilitates stabilizing tower assembly. Specifically, the counter-balance system includes a counterweight and a dampener subsystem that facilitates creating hydrodynamic drag on tower assembly to attenuate movement of tower assembly due to wind and wave forces. As a result, tower assembly facilitates allowing measurement equipment to acquire data pertaining to wind and water conditions at possible site locations for the placement of a wind turbine in a reliable and cost-effective manner.

Exemplary embodiments of a tower assembly are described above in detail. The tower assembly is not limited to the specific embodiments described herein, but rather, components of each assembly may be utilized independently and separately from other components described herein. For example, each tower assembly component can also be used in combination with other tower assembly components.

While the invention has been described in terms of various specific embodiments, those skilled in the art will recognize that the invention can be practiced with modification within the spirit and scope of the claims.

What is claimed is:

1. A method for determining a site for an offshore wind turbine, said method comprising:
    determining a plurality of possible site locations;
    positioning an offshore assembly at at least one of the possible site locations, wherein the assembly includes a floating support structure, a tower extending upwardly from the floating support structure, equipment coupled to the tower, and a counter-balance system coupled to the floating support structure at a location below a center of gravity of the floating support structure;
    measuring conditions at the at least one of the possible site locations using the equipment; and
    determining a site for the offshore wind turbine from the plurality of possible site locations based on the conditions at the at least one of the possible site locations.

2. A method in accordance with claim 1 wherein the conditions are measured at an elevation at which the offshore wind turbine will be located.

3. A method in accordance with claim 1 further comprising stabilizing the offshore assembly using a dampener coupled to the counter-balance system, wherein the dampener provides hydro-dynamic drag in at least one of a vertical direction, a horizontal direction, and a rotational direction.

4. A method in accordance with claim 1 further comprising stabilizing the offshore assembly using a dampener that includes at least one disk extending from the counter-balance system.

5. A method in accordance with claim 1 further comprising stabilizing the offshore assembly using a dampener that includes at least one dampening tube having at least one dampening jet, wherein the at least one dampening tube is filled with fluid, wherein the at least one dampening jet provides fluid flow in an opposite direction of movement of the counter-balance system.

6. An assembly comprising:
    a floating support structure;
    a tower extending upwardly from said floating support structure;
    equipment coupled to said tower; and
    a counter-balance system coupled to said floating support structure at a location below a center of gravity of said floating support structure wherein said floating support structure comprises at least one buoy and an anchor coupled to said at least one buoy, wherein said floating support structure is moveable between a plurality of possible site locations for the placement of an offshore wind turbine, such that said assembly is used to determine wind conditions at the plurality of possible site locations.

7. An assembly in accordance with claim 6 wherein said floating support structure is located below a water surface.

8. An assembly in accordance with claim 6 wherein said tower comprises a plurality of beams extending substantially perpendicularly from said tower and a plurality of guy wires extending between said tower and said plurality of beams, such that said guy wires are configured to provide support for said tower, wherein said equipment is coupled to said beams.

9. An assembly in accordance with claim 6 wherein said equipment comprises at least one of meteorological equipment and wave monitoring equipment.

10. An assembly in accordance with claim 6 wherein said counter-balance system comprises a column extending outwardly along the center of gravity for a distance, and a counterweight coupled to said column.

11. An assembly in accordance with claim 6 wherein said counter-balance system comprises a column, a counterweight coupled to said column, and a dampener coupled to said column, wherein said dampener provides hydro-dynamic drag in at least one of a vertical direction, a horizontal direction, and a rotational direction.

12. An assembly in accordance with claim 11 further comprising dampening jets coupled to said dampener, wherein said dampening jets provide fluid flow in an opposite direction of movement of said counter-balance system.

13. An offshore meteorological assembly for determining a location for an offshore wind turbine, said assembly comprising:
    a floating support structure;
    a tower extending upwardly from said floating support structure;
    equipment coupled to said tower at a height above the water surface level, wherein the height is selected to measure wind conditions at the elevation of the offshore wind turbine above the water surface level; and
    a counter-balance system coupled to said floating support structure at a location below a center of gravity of said floating support structure.

14. An assembly in accordance with claim 13 wherein said floating support structure is located below a water surface to facilitate minimizing the effect of wave oscillation on said floating support structure.

15. An assembly in accordance with claim 13 wherein said tower comprises a plurality of beams extending substantially perpendicularly from said tower and a plurality of guy wires extending between said tower and said plurality of beams, such that said guy wires are configured to provide support for said tower, wherein said equipment is coupled to said beams.

16. An assembly in accordance with claim 13 wherein said equipment comprises at least one of a rate gyro, an accelerometer, an anemometer, and an inclinometer for measuring wind velocities.

17. An assembly in accordance with claim 13 wherein said counter-balance system comprises a column extending outwardly along the center of gravity for a distance, and a counterweight coupled to said column, wherein said counter-balance system is configured to stabilize said tower.

18. An assembly in accordance with claim 13 wherein said counter-balance system comprises a column, a counterweight coupled to said column, and a dampener coupled to said column, wherein said dampener provides hydrodynamic drag in at least one of a vertical direction, a horizontal direction, and a rotational direction.

19. An assembly in accordance with claim 13 further comprising dampening jets coupled to said dampener, wherein said dampening jets provide fluid flow in an opposite direction of movement of said counter-balance system.

* * * * *